(12) United States Patent
Olliphant et al.

(10) Patent No.: US 9,449,311 B2
(45) Date of Patent: *Sep. 20, 2016

(54) METHODS AND SYSTEMS FOR FACILITATING TRANSACTIONS USING BADGES

(71) Applicant: eBay Inc., San Jose, CA (US)

(72) Inventors: Hugo Olliphant, San Francisco, CA (US); Sandra Lynn Godsey, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,356

(22) Filed: Feb. 24, 2014

(65) Prior Publication Data

US 2014/0172475 A1    Jun. 19, 2014

Related U.S. Application Data

(63) Continuation-in-part of application No. 14/103,747, filed on Dec. 11, 2013, which is a continuation of application No. 12/176,239, filed on Jul. 18, 2008, now Pat. No. 8,612,863.

(51) Int. Cl.

| G06Q 30/00 | (2012.01) |
| G06Q 20/02 | (2012.01) |
| G06Q 20/04 | (2012.01) |
| G06Q 20/12 | (2012.01) |
| G06Q 30/02 | (2012.01) |
| G06Q 20/10 | (2012.01) |
| G06Q 20/32 | (2012.01) |

(52) U.S. Cl.
CPC ............. *G06Q 20/02* (2013.01); *G06Q 20/04* (2013.01); *G06Q 20/10* (2013.01); *G06Q 20/12* (2013.01); *G06Q 20/3276* (2013.01); *G06Q 30/02* (2013.01); *G06Q 30/0222* (2013.01); *G06Q 30/0279* (2013.01); *G06Q 30/0225* (2013.01)

(58) Field of Classification Search
USPC ...................................................... 705/14.4
See application file for complete search history.

(56) References Cited

U.S. PATENT DOCUMENTS

| 7,860,804 | B2 * | 12/2010 | Littrell ................... G06Q 10/10 705/319 |
| 8,112,310 | B1 * | 2/2012 | Yehoshua et al. ......... 705/14.42 |
| 8,571,930 | B1 * | 10/2013 | Galperin .................... 705/14.43 |
| 8,612,863 | B2 | 12/2013 | Olliphant |
| 2003/0018521 | A1 * | 1/2003 | Kraft ....................... G06Q 30/02 705/14.15 |
| 2005/0033771 | A1 | 2/2005 | Schmitter et al. |
| 2005/0251485 | A1 | 11/2005 | Quigley |

(Continued)

OTHER PUBLICATIONS

"U.S. Appl. No. 12/176,239 , Response filed Jan. 11, 2012 to Non Final Office Action mailed Oct. 11, 2011", 12 pgs.

(Continued)

*Primary Examiner* — Kira Nquyen
(74) *Attorney, Agent, or Firm* — Schwegman, Lundberg & Woessner, P.A.

(57) ABSTRACT

In various embodiments, a system and method for facilitating transactions using a badge are provided. In example embodiments, codes for a badge to be displayed on a web page of a web site are generated. The codes for the badge are embedded in the web page prior to an occurrence of an event external to the web site. In response to an indication of the event, the embedded codes are activated to display the badge on the web page.

20 Claims, 12 Drawing Sheets

(56) References Cited

U.S. PATENT DOCUMENTS

| | | | |
|---|---|---|---|
| 2006/0282314 | A1 | 12/2006 | Zamanian et al. |
| 2007/0038956 | A1* | 2/2007 | Morris .......................... 715/808 |
| 2007/0210910 | A1* | 9/2007 | Norstrom et al. ............ 340/506 |
| 2007/0260520 | A1 | 11/2007 | Jha et al. |
| 2008/0059571 | A1* | 3/2008 | Khoo ............................ 709/203 |
| 2008/0189215 | A1* | 8/2008 | Travez ................. G06Q 50/188 705/80 |
| 2009/0006190 | A1 | 1/2009 | Lucash et al. |
| 2009/0192888 | A1* | 7/2009 | Barton et al. ................... 705/14 |
| 2009/0276345 | A1 | 11/2009 | Hughes |
| 2010/0017217 | A1 | 1/2010 | Olliphant |
| 2010/0114722 | A1* | 5/2010 | Ueshima et al. .......... 705/14.73 |
| 2014/0101536 | A1 | 4/2014 | Olliphant |

OTHER PUBLICATIONS

"U.S. Appl. No. 12/176,239 , Response filed Aug. 5, 2011 to Final Office Action mailed Jun. 24, 2011", 10 pgs.

"U.S. Appl. No. 12/176,239, Examiner Interview Summary mailed Mar. 31, 2011", 3 pgs.

"U.S. Appl. No. 12/176,239, Final Office Action mailed Apr. 11, 2012", 25 pgs.

"U.S. Appl. No. 12/176,239, Final Office Action mailed Jun. 24, 2011", 21 pgs.

"U.S. Appl. No. 12/176,239, Non Final Office Action mailed Jan. 21, 2011", 21 pgs.

"U.S. Appl. No. 12/176,239, Non Final Office Action mailed Feb. 5, 2013", 24 pgs.

"U.S. Appl. No. 12/176,239, Non Final Office Action mailed Oct. 11, 2011", 20 pgs.

"U.S. Appl. No. 12/176,239, Notice of Allowance mailed Aug. 20, 2013", 6 pgs.

"U.S. Appl. No. 12/176,239, Response filed May 6, 2013 to Non Final Office Action mailed Feb. 5, 2013", 12 pgs.

"U.S. Appl. No. 12/176,239, Response filed Jul. 11, 2012 to Final Office Action mailed Apr. 11, 2012", 11 pgs.

"U.S. Appl. No. 12/176,239, Response filed Apr. 14, 2011 to Non Final Office Action mailed Jan. 21, 2011", 12 pgs.

"U.S. Appl. No. 14/103,747, Non Final Office Action mailed Apr. 11, 2014", 15 pgs.

"U.S. Appl. No. 14/103,747, Preliminary Amendment filed Mar. 3, 2014", 9 pgs.

"U.S. Appl. No. 14/103,747, Examiner Interview Summary mailed Jan. 30, 2015", 3 pgs.

"U.S. Appl. No. 14/103,747, Final Office Action mailed Nov. 3, 2014", 17 pgs.

"U.S. Appl. No. 14/103,747, Non Final Office Action mailed Jun. 18, 2015", 13 pgs.

"U.S. Appl. No. 14/103,747, Response filed Feb. 3, 2015 to Final Office Action mailed Nov. 3, 2014", 13 pgs.

"U.S. Appl. No. 14/103,747, Response filed Jul. 11, 2014 to Non Final Office Action mailed Apr. 11, 2014", 13 pgs.

"U.S. Appl. No. 14/103,747, Response filed Sep. 18, 2015 to Non Final Office Action mailed Jun. 18, 2015", 10 pgs.

* cited by examiner

400

| | Sign Up | Log In | Help | Security Center | | Search |

U.S. English

What types of causes would you like to support?
- ☐ Disaster Relief
- ☐ Seasonal Giving  — 405

Which charities would you like to support?
- ☐ Red Cross
- ☐ Unitas
- ☐ Salvation Army  — 410

FIG. 4A

METHODS AND SYSTEMS FOR FACILITATING TRANSACTIONS USING BADGES

CROSS REFERENCE TO RELATED APPLICATION

The present application is a continuation-in-part application of and claims priority benefit from U.S. patent application Ser. No. 14/103,747 filed on Dec. 11, 2013 and entitled "Methods and Systems for Setting and Enabling Codes on Web Pages," which is a continuation application of U.S. patent application Ser. No. 12/176,239 filed on Jul. 18, 2008 and entitled "Methods and Systems for Setting and Enabling Codes on Web Pages," both of which are incorporated herein by reference.

TECHNICAL FIELD

The present application relates generally to data processing and, in one specific example, to a method and system of facilitating transactions using badges.

BACKGROUND

When disasters (e.g., hurricane, storm, tsunami, etc.) strike, many establishments set up collection mechanisms to collect donations to support the victims. These mechanisms may include links on web sites to encourage donations electronically. For example, donations may be done via credit cards or via any other forms of monetary transfers including transfers from accounts associated with payment facilitators (e.g., PayPal Inc. of San Jose, Calif.). Unfortunately, when there are people making donations to the victims, there are also scammers that take advantage of the situations. These scammers may fraudulently claim that they collect the donations for the victims. Since the donation levels typically are at their highest immediately after the disasters struck, it is often difficult to quickly verify the scammers or where the donations go during that time. By the time the scams are detected, large amounts of donations have already been misdirected to the scammers and away from the victims.

In other cases, users may want to take advantage of excitement over an announcement of an event as soon as possible. However, time and effort is required to set up and provide access to information for the event. As such, the users may not be able to capitalize on the excitement as quickly as they would like.

BRIEF DESCRIPTION OF THE DRAWINGS

Some embodiments are illustrated by way of example and not limitation in the figures of the accompanying drawings in which:

FIG. 4A is a diagram that illustrates an example of a user interface that may be used to receive information about a badge to be generated, in accordance with some example embodiments.

DETAILED DESCRIPTION

For some example embodiments, methods and system to set up and to enable web-based badges are described. A web-based badge may be set up for a web site. A display area or a frame on a web page of a web site where the web-based badge is to be displayed may be determined. Code to display the web-based badge may be generated. The web-based badge may not be displayed or activated until an event occurs or indicated to occur (e.g., in a predetermined amount of time). In some embodiments, the event is a natural disaster. In other embodiments, the event may be an entertainment event (e.g., concert, show) or an event triggered by a user (e.g., purchase of a song or ticket or indication of interest in purchasing a song or ticket). In some embodiments, similar badges may be established for presentation on an application or other visual display.

In the following description, for purposes of explanation, numerous specific details are set forth in order to provide a thorough understanding of example embodiments. It will be evident, however, to one skilled in the art that embodiments of the present invention may be practiced without these specific details.

In example embodiments, a computer system (e.g., a client machine, server machine) or its components configured by an application may constitute a "module" that is configured and operates to perform certain operations as described herein. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Platform Architecture

Figure 1A:
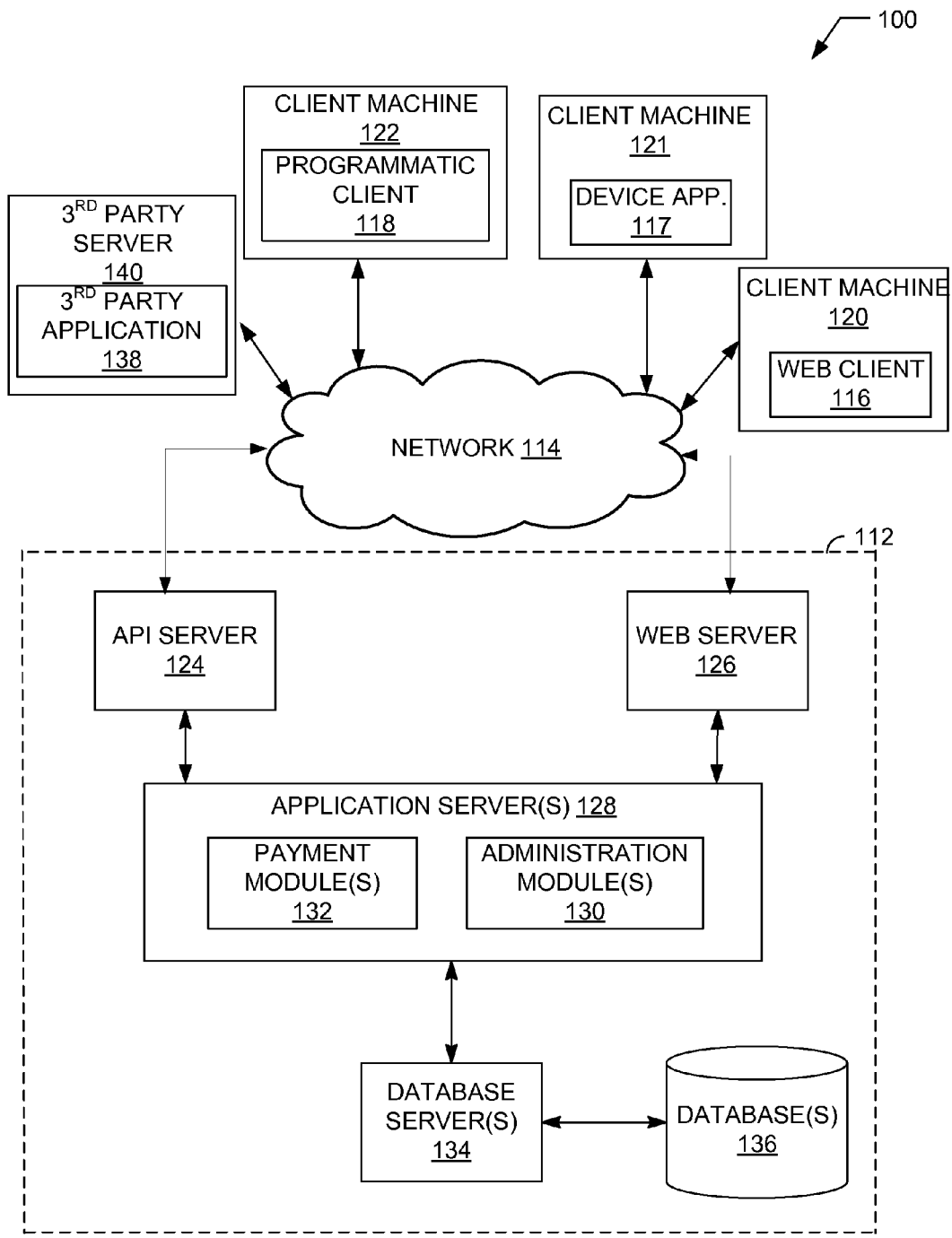
FIGS. 1A-1B illustrate network diagrams depicting a system, according to an example embodiment, having a client-server architecture.

FIG. 1A illustrates a network diagram depicting a system 100 having client-server architecture, according to an example embodiment. A system, in the example form of a network-based system 112, provides server-side functionality, via a network 114 (e.g., the Internet, a public or private telephone network (wired or wireless), a private wireless network using technologies such as Bluetooth or IEEE 802.11x or other networks) to one or more clients. FIG. 1A illustrates, for example, a web client 116 (e.g., a browser, such as the INTERNET EXPLORER® browser developed by MICROSOFT®) executing on client machine 120. A device application 117 may execute on a client machine 121. A programmatic client 118 may execute on client machine 122. Each of the client machines 120-122 may be referred to as a network-based machine. Further, while the system 100 shown in FIG. 1A employs client-server architecture, embodiments are of course not limited to such an architecture, and could equally well find applications in a distributed, or peer-to-peer, architecture system.

The client machines 120-122, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The client machines 120-122 may include a card, such as a smart card, a magnetic card, and/or a key card. The client machines 120-122 may include a telephone or any device capable of Short Messaging Service (SMS) messaging, multimedia messaging service (MMS) messaging and/or generating audio tones, such as dual-tone multi-frequency (DTMF) tones.

The client machines 120-122 may be browser-enabled. The client machines 120-122 may engage in an interactive message and/or open communication session, such as SMS, electronic mail, Extensible Hypertext Markup Language (xHTML), Wireless Application Protocol (WAP), web, interactive voice response (IVR) and/or other mobile interfaces. The communication session between the client machines 120-122 and the network-based system 112 may involve multiple technology modalities. For example, a user of the client machines 120, 121 or 122 may engage the network-based system 112 via SMS and receive a responsive communication as an SMS with an embedded hyperlinked URL directing the client machines 120, 121, or 122 to a WAP or web page. A hyperlinked URL may be delivered directly to the client machines 120-122 from the application server(s) 128 and may be used to access a web site or a micro-browser, such as a WAP site. The client machines 120-122 may enable mobile videophone communications, digital television signals, and/or digital radio signals. The client machines 120-122 may include a receiver to receive near field communications.

Turning specifically to the network-based system 112, an Application Program Interface (API) server 124, and a web server 126 may be coupled to, and may provide programmatic interface and web interface to one or more application servers 128. The client machines 120-122 may use one or more of these interfaces to access the application server(s) 128.

For example, the web client 116 may access the application server(s) 128 via a web interface supported by the web server 126. The web interface may include a web browser or any micro-browser, such as xHTML or WAP. Similarly, the programmatic client 118 may access the various services and functions provided by the application server(s) 128 via the programmatic interface provided by the API server 124 and/or via the web interface provided by the web server 126. For an additional embodiment, an application supported by one or more applications of the application server(s) 128 may be downloadable to the client machines 120-122.

The client machines 120-122 may host the interface associated with the one or more applications of the application server(s) 128. The interface on the client machines 120-122 may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the client machines 120-122. The J2ME interface may include an API for the client machines 120-122. The application of the programmatic client 118 may also access the network 114 using, for example, Binary Runtime Environment for Wireless (BREW).

The device application 117 executed on the client machine 121 may access the application server(s) 128 via the web interface of the web server 126. The device application 117 may be selected on the client machine 121 and launched in a background. The device application 117 may additionally or alternatively access the server(s) 128 via the programmatic interface of the API server 124. In an embodiment, the downloaded application described herein may include the device application 117.

The application server(s) 128 may host one or more administration module(s) 130 and one or more payment module(s) 132. The application server(s) 128 are, in turn, shown to be coupled to one or more database servers 134 that facilitate access to one or more databases 136. The account administration module(s) 130 may provide for administration of various accounts, as discussed in more detail herein.

A third party application 138 executing on a third party server 140 may offer goods and services to users of the client machines 120-122. The third party application 138 may have programmatic access to the network-based system 112 via the programmatic interface provided by the API server 124. The third party application 138 may be associated with a vendor, a merchant, or any organizations that may conduct transactions with the users of the client machines 120-122. For some example embodiments, the third party application 138 may be associated with an online marketplace (e.g., eBay, Inc. or StubHub). In example embodiments, the online marketplace may be hosted by the application server(s) 128.

The payment module(s) 132 may provide a number of payment services and functions to the users of the client machines 120-122. The payment module(s) 132 may allow the users to accumulate value (e.g., in a commercial currency, such as the U.S. dollar, or a proprietary currency, such as "points") in accounts, and then later to redeem the accumulated value via several possible avenues. The payment module(s) 132 may also extend credit to a user and/or may also have access to other funding sources to complete transactions. Examples of the funding sources include a credit card, a bank account, and/or a credit line. The payment module(s) 132 may operate as a money transmitter.

A third party associated with the third party application 138 may conduct transactions with a user and may receive information from the payment module(s) 132. The information may include information regarding an order for a product, a service, a gift, a donation, and so forth. The information may also include shipment address specified by the user and payment status including payment confirmation. The payment module(s) 132 may secure financial information of the user with respect to the third party.

The client machine 120, 121, or 122 may host the interface associated with the payment module(s) 132 of the application server(s) 128. The web client 116, the device application 117, and/or the programmatic client 118 may be associated with the account management module(s) 130 and/or the payment module(s) 132.

The payment module(s) 132 may also be implemented as a standalone software program, which does not necessarily have networking capabilities. For this embodiment, the client machines 120-122 may be directly connected to the payment module(s) 132, without using the network 114.

The payment module(s) 132 may have access to the database 136 which may be coupled to database server(s) 134. The database 136 may include user account information. The user account information may include payment information, credit card information, checking account information, address information, and so forth.

The web client 116, the device application 117, and/or the programmatic client 118 may operate a program supported by the one or more database server(s) 134. The database server(s) 134 may support one or more account information links on a user interface of the client machines 120-122, for example, using the web client 116. By accessing the database server(s) 134, the user may add, amend or delete their own account information including, for example, shipment address, payment method, etc.

The network 114 may include a mobile telephone network, a wireless wide area network (WWAN), a wired telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), Ultra-Wide Band, and/or Infrared. The client machines 120-122 may connect to the web using mobile internet exchange protocol such as, for example, Wireless Application Protocol (WAP) and/or Hypertext Transport Protocol (HTTP).

Figure 1B:
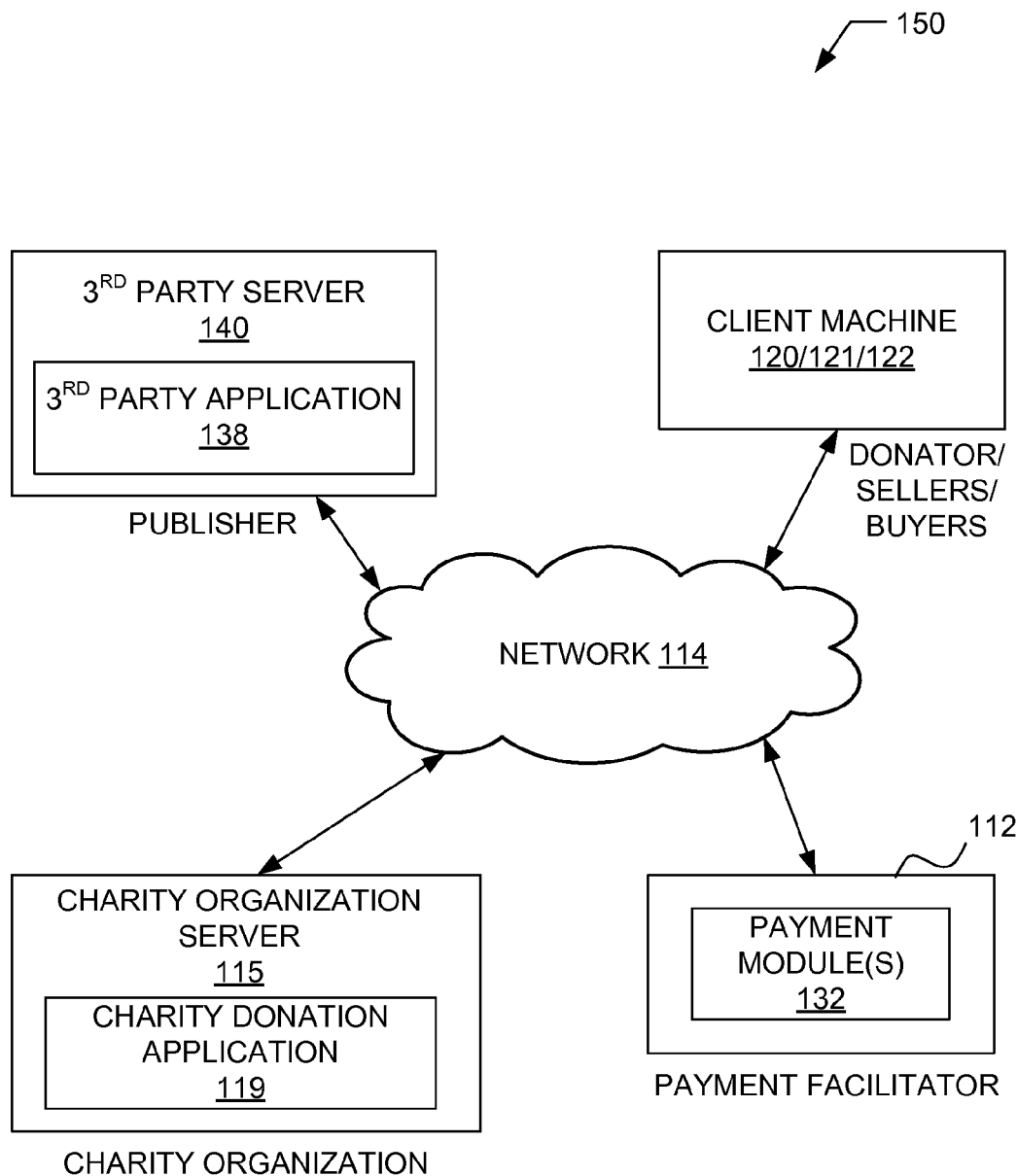

FIG. 1B illustrates another network diagram depicting a system 150, according to an example embodiment. The system 150 may be similar to the system 100 except for the addition of a charity organization server 115. The network 114 may allow the client machines 120-122 to communicate with the third party server 140 (e.g. a vendor/merchant server) and/or a charity organization server 115. The network 114 may also allow the client machines 120-122 to communicate with the application server(s) 128 of the network-based system 112. The charity organization server 115 may communicate with one or more of the application server(s) 128, the third party server 140, and the client machines 120-122. A charity donation application 119 may process donations received from the users via one or more of the third party server 140, the application server(s) 128, and the client machines 120-122. The charity organization server 115 may be associated with a charity organization such as, for example, the American Red Cross®.

For some example embodiments, a web site associated with the third party server 140 may include one or more web pages that display a web-based badge. A merchant, vendor, or organization associated with the third party server 140 may also be referred to as a publisher. A user using one of the client machines 120-122 may see the web-based badge displayed on a webpage of the publisher and may initiate certain transactions as a result of having seen the web-based badge. In other embodiments, the web-based badge may be displayed on a webpage associated with the network-based system 112. For some example embodiments, the web-based badge may be a charity badge. The charity badge may be displayed when a disaster event occurs. For some example embodiments, the transactions initiated by the users may include donation transactions. The donations may be made to a charity organization associated with the charity badge.

In other embodiments, the web-based badge may be an event badge that when triggered links to an event (or transaction involving the event) or provides access to goods (e.g., merchandise, tickets, downloadable content) or further information corresponding to the event. The link may offer to sell tickets to the event or may provide a trigger to a user (e.g., user selecting the link) to offer to purchase tickets from someone that already has tickets (e.g., "make me stay home" button). In some instances, the web-based badge may be a code (e.g., QR (Quick Response) code), image, or other visual display that may be selected or scanned to access the goods or further information.

For some example embodiments, donations may be made by selecting the charity badge. This may be accomplished by, for example, placing a cursor control pointer in or near a vicinity of the charity badge and selecting or pressing a button associated with the cursor control pointer. This may cause a transfer of funds in any currency to the charity organization via the services of the application server(s) 128 and the network 114. For some example embodiments, the transfer funds may require payment authorization by the user.

For some example embodiments, the publishers may collect the donations on behalf of the charity organization. As such, the payment authorization by the user may include authorizing the transfer of funds from an account of the user to an account of the publisher, with both accounts being associated with the payment facilitator 112. For some example embodiments, instead of having the publisher acting as a middleman, the transfer of funds may be from an account of the user to an account of the charity organization, with both accounts being associated with the payment facilitator 112.

Application Server(s)

Figure 2:
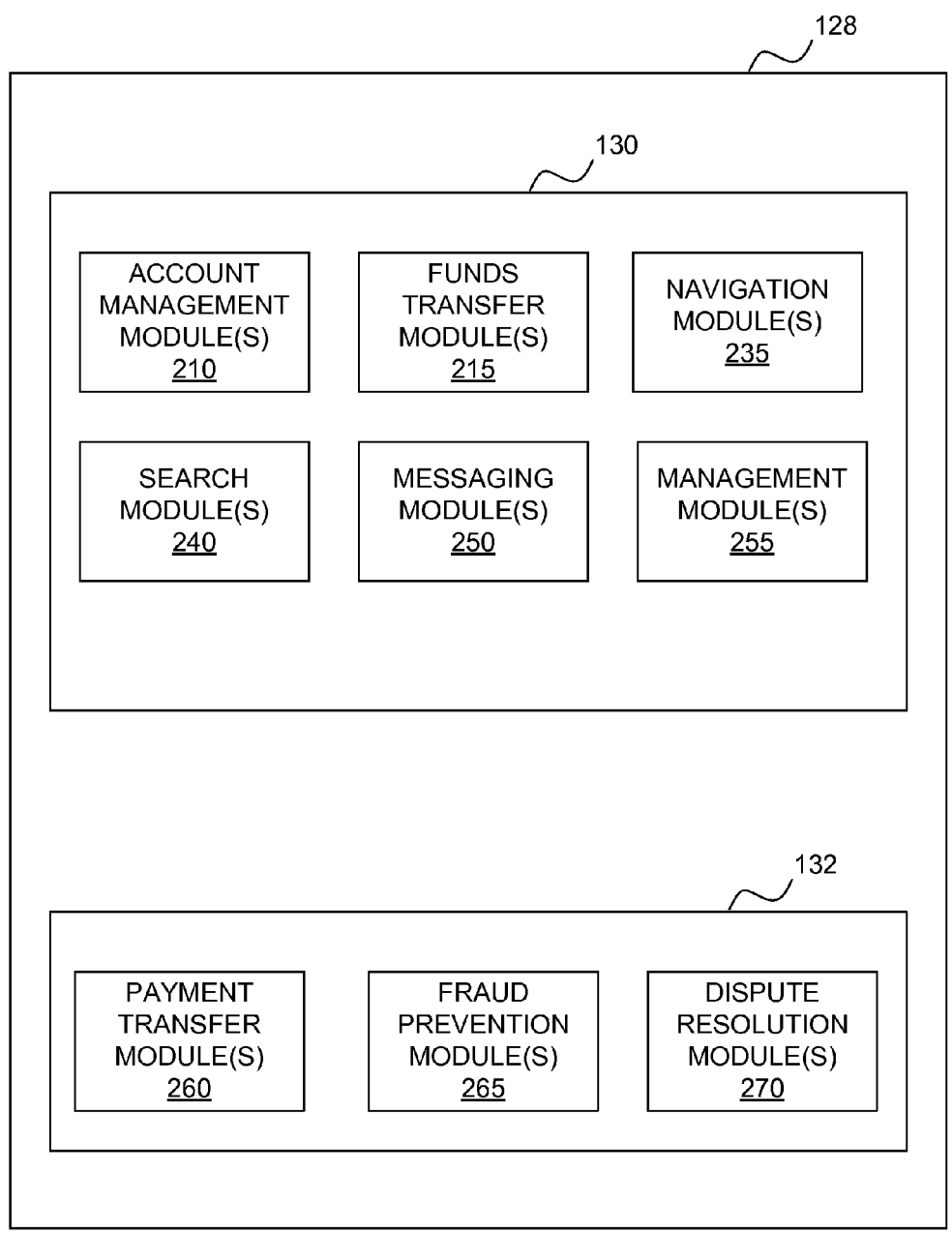
FIG. 2 illustrates a block diagram showing application servers, in an example embodiment.

FIG. 2 illustrates a block diagram showing the application server(s) 128 that are part of the network-based system 112, in accordance with an example embodiment of the present invention. In this embodiment, the payment module(s) 132 and the administration module(s) 130 may be hosted by the application server(s) 128 of the network-based system 112.

The administration module(s) 130 illustrated in FIG. 1A may include account management module(s) 210, funds transfer module(s) 215, navigation module(s) 235, search module 240, messaging module(s) 250, and management module(s) 255. Other modules not necessary for operations of example embodiments may also be included.

The account management module(s) 210 may be configured to set up, manage, and control accounts for the users. For example, the account management module(s) 210 may enable a user to associate an account with a credit card. The account management module(s) 210 may have access to the database servers 134 to retrieve and to update account information.

The funds transfer module(s) 215 may be configured to transfer funds among the various accounts associated with the users (also referred to as account holders). For example, the transfer may be between an account of the user to an account of the third party or an account of the charity organization. The funds transfer module(s) 215 may include verification/approval operations. The verification/approval operations may analyze funds transfer and determine whether approval should be granted. For example, the verification/approval operations may block or limit funds transfer from a user account to an account previously marked as questionable. The verification/approval operations may generate warnings about pending funds transfer and may permit the account holder to override the warnings.

The verification/approval operations may communicate with a third party application 138 executing on a third party server 140 to determine if there are any changes to pending transactions. The verification/approval operations may access a database associated with the third party server 140 or associated with the database server(s) 134.

The navigation module(s) 235 may enable browsing of various products, services, promotions, etc. published via the network-based system 112. The search module(s) 240 may allow the users to search for various categories that may be classified within the network-based system 112. Various other navigation modules may be provided to supplement the search and browsing operations.

The messaging modules 250 may be responsible for generation and delivery of messages to the users and to the third parties of the network-based system 112. The messages may advise the users regarding the status of transactions associated with the network-based system 112. The messaging module(s) 250 may use SMS, IVR, email, or any other appropriate messaging module. Access to the messaging module(s) 250 may be granted, limited or restricted with respect to certain account holder as set in parameters defined by the other related account holder.

For some example embodiments, the administration module(s) 130 may include the management module(s) 255. In some embodiments, the management module(s) 255 may perform operations that enable third parties via the third party server(s) 140 to more efficiently enable the users to donate to the charity organizations. In other embodiments, the management module(s) 255 enable a user to access goods and information corresponding to an event. The management module(s) 255 will be discussed in more detail in connection with FIG. 3.

The payment module(s) 132 illustrated in FIG. 1A may include a payment transfer module 260, a fraud prevention module(s) 265, and/or dispute resolution module(s) 270.

The payment transfer module(s) 260 may transfer a payment from one of the user accounts discussed herein to the third party via the third party server 140 or to a charity via the charity organization server 115. The payment transfer module(s) 260 may utilize the approval/verification operations before transferring a payment. In some embodiments, the functions of the funds transfer module(s) 215 may be combined with the payment transfer module(s) 260.

The fraud prevention module(s) 265 may implement various fraud detection and prevention mechanisms to reduce the occurrence of fraud within the network-based system 112. The fraud prevention module(s) 265 may prevent fraud with respect to the third party and/or the user in relation to any part of the request, payment, information flows and/or request fulfillment. Fraud may occur with respect to unauthorized use of financial instruments, non-delivery of goods, and abuse of personal information. Fraud may occur with respect to using pretense to set up a charity organization for the purpose of illegally collecting donations. Various techniques may be used to implement the fraud prevention module(s) 265 to detect and prevent or reduce fraud. For example, an IP address associated with a web site that collects donation from United States citizens but is originated from outside the United States may be a sign of fraud.

The dispute resolution module(s) 270 may provide mechanisms whereby disputes arising between transacting parties may be resolved. For example, the dispute resolution modules 270 may provide guided procedures whereby the parties are guided through a number of steps in an attempt to settle a dispute. In the event that the dispute cannot be settled via the guided procedures, the dispute may be escalated to a mediator or arbitrator.

Management Module(s)

Figure 3:
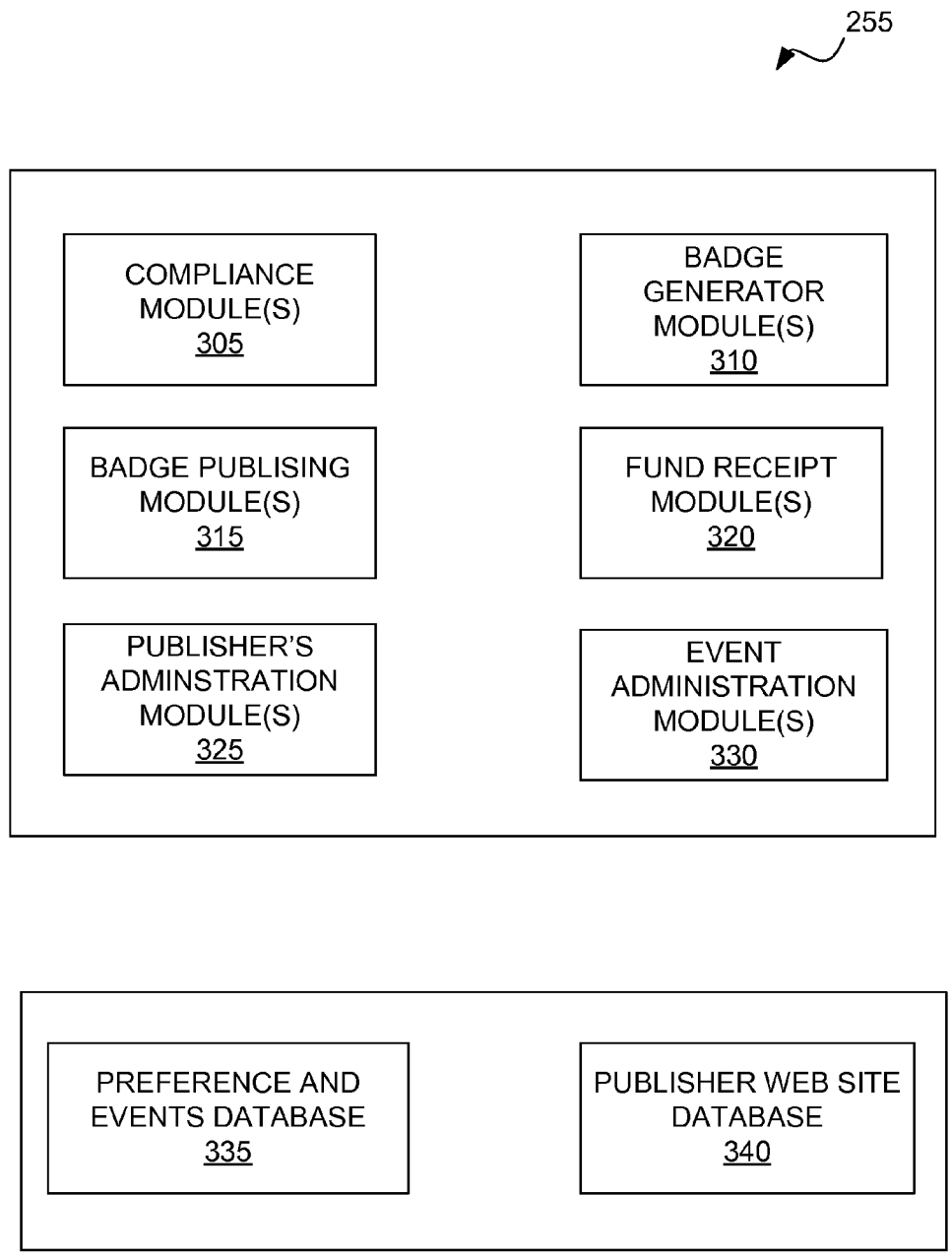
FIG. 3 illustrates a high-level diagram of the management module(s), in accordance with some example embodiments.

FIG. 3 illustrates a high-level diagram of the management module(s) 255, in accordance with some example embodiments. For some example embodiments, the management module(s) 255 may include compliance module(s) 305, badge generator module(s) 310, badge publishing module(s) 315, fund receipt module(s) 320, publisher administration module(s) 325, and event administration module(s) 330.

The management module(s) 255 may have access to a preference and events database 335 and a publisher web site database 340. The preference and events database 335 and the publisher web site database 340 may be coupled to (or embodied within) the database(s) 136 and may be associated with the database server(s) 134. The publisher web site database 340 may store information about the web sites of the publishers. The preference and events database 335 may store preference information of the publishers and/or store information on the events including offers for goods related to the events.

The compliance module 305 may perform operations to verify identity of the publishers and/or their web sites. For some example embodiments, the publishers may use the payment services of the payment module(s) 132 to conduct financial transactions with the users of the client machines 120-122. The financial transactions may include donations made by the users to the charity organizations or payment for purchase transactions (e.g., to purchase tickets or merchandise related to an event). In some embodiments, the compliance module 305 may perform operations to verify identity of the charity organizations or a seller or buyer of goods (e.g., merchandise, tickets) to prevent fraud and may completely or partially deny any transfer of funds when fraud is detected. For example, the compliance module 305 may only allow the funds transfer to occur for up to a certain amount.

Determination of compliance may be based on a set of rules. For example, one such rule may require a charity organization, seller, or buyer to have a physical address and a contact phone number in the United States. The compliance module 305 may perform operations that report frauds to an enforcement agency.

The badge generator module(s) 310 may perform operations that generate codes or scripts for badges (e.g., charity badges, QR codes, images corresponding to an event). The codes are to be distributed to the publishers for displaying on one or more web pages. For example, the code generated by the badge generator module(s) 310 may include Hypertext Markup Language (HTML) code. The badge generator module(s) 310 may use preset badge size information to generate the code. There may be various badge sizes, and a publisher may indicate a preferred badge size. It is noted that in one embodiment, the network-based system 112 may be the publisher, or a user of the network-based system 112 may be the publisher.

Content of a charity badge may be generic or pre-determined and may or may not include information provided by the publishers. A pre-determined content may be, for example, donating to the American Red Cross. The information provided by the publisher may include, for example, name of the publisher for more customization. For example, the charity badge may indicate "Help eBay help the victims of the Katrina hurricane—Donate to the American Red Cross." Similarly, a QR code or image corresponding to an event may include information provided by the publisher.

A publisher may indicate names of the charity organizations (e.g., the American Red Cross, the Cancer Society, etc.) that the publisher wants to collect the donations for. Additionally or alternatively, the publisher may indicate regions (e.g., United States, Asia, China, worldwide, etc.) where events may occur and that the publisher wants to collect the donations for or provide information about. This may be performed via the publisher's administration module 325 which may provide an interface for the publisher to select event types and/or charity organizations to support. The information may be stored in the preference and events database 335. Some examples of disaster/charitable events include the Tsunami in Asia, the Katrina hurricane in the United States, the earthquakes in China, and so forth. As an example, a publisher may collect donations for the American Red Cross to help victims of the earthquakes in China.

A publisher may indicate a location on a web page where the badge is to be displayed. It may be noted that, in some embodiments, because the decisions as to size, placement, and in some situations the content of the badge are made prior to an event (or an indication of the event) occurring, there may be minimal delay before the badge is displayed.

The third party server(s) 140 may be associated with the publishers. For some example embodiments, the codes generated by the badge generator module(s) 310 may be transmitted to the third party server(s) 140 before an event occurs. An advantage of this technique is the readiness of the codes and the ability to display the badges with minimal delay. As mentioned above, the sooner a publisher displays a badge (e.g., charity badge) to collect donations for an event, the more donations may be received. Similarly, the sooner the publisher displays a badge for a recently announced event (e.g., concert), the more interest and thus more selection of the badge to access further information or purchase goods will occur. For some example embodiments, the code may be installed on a web page associated with a publisher before any events occur (e.g., in anticipation of an announcement of the event). The installed codes may not be visible or activated. For some example embodiments, there may be an option to test the display of the badge. For example, the publishers may want to see if the badge blends with its neighboring images, etc. For some example embodiments, the codes may be transmitted and installed shortly after an event occurs. This may allow the codes to be updated with information about the event. For example, instead of a badge indicating "Donate to the American Red Cross", the charity badge may indicate "Help the victims of the Katrina hurricane, donate to the American Red Cross."

For some example embodiments, the publisher may need to place a snippet of codes on a web page where a badge is to be displayed. The snippet may include badge identification information and its height and width information. Following is an example of a snippet: <script src="http://www.sourcesite.com/?pubid=12345&test=0&height=200&width=160"></script>

The badge publishing module(s) 315 may cause or trigger a badge to be displayed on a web page. This may be in response to when an event (e.g., a disaster) occurs or to when an event is announced, for example. The badge publishing module(s) 315 may transmit an activation signal to cause a badge to be published (or activated, or become visible). It may be noted that the codes for the badge may have been previously transmitted and installed on the web page. It may be noted that the codes may be generated on behalf of multiple publishers (e.g., when the codes are for generic charity badges). As such, the activation signal may be transmitted to cause web pages of multiple publishers to display the badges. When the codes to display the badge have not been previously transmitted, the badge publishing module(s) 315 may transmit and activate the codes shortly after the event occurs or is announced.

The event administration module(s) 330 may perform operations that enable an event administrator to specify information or attributes about events when the events occur or are announced (whereby the announcement of the event, in itself, is an event that triggers the publication of the badge). The information specified by the event administrator may trigger or activate a badge via the badge publishing module(s) 315. The attributes may include, for example, type of event (e.g. natural disaster, concert, album release, purchase of a song by a user), geography of the event (e.g., Paraguay), and organizations that support the event (e.g., the American Red Cross, concert promoter, record label). The information provided by the event administrator may be stored in the preference and events database 335. For some example embodiments, the event administrator may be able to turn off selected events after a certain time period, or when it is determined that the event is outdated.

For some example embodiments, the badge publishing module(s) 315 may compare the publisher's preferences (as stored in the preference and events database 335) and compares those to any events which have been specified by the event administrator. Following one of the examples above, a publisher who has opted into natural disasters anywhere in the globe that are supported by the Red Cross would match an active event that is triggered by a natural disaster in Paraguay and supported by the Red Cross. For some example embodiments, when there is no match for a given publisher, then the badge publishing module(s) 315 may transmit neutral or blank content into the script tag that the publisher installed or embedded into their web pages. Following is an example of a neutral script: document.write(' ').

For some example embodiments, when the comparison described above results in a match, the badge publishing module(s) 315 may transmit a relevant script for the tag that the publisher installed or embedded into a web page. Following is an example of such a script: document.write("<a href='http://badge.paypallabs.com/?eventid=1234'><img src='http://badge.paypallabs.com/badge1234.gif'></a>").

It may be noted that the scripts described herein are examples and used for illustrative purposes only. For some example embodiments, the script may be developed as a flash widget installed onto the publisher's web page. The script may result in a badge appearing on the publisher's web site whenever a qualifying event occurs. Note that this type of service may be rendered through image tags or script tags.

Example User Interface

FIG. 4A is a diagram that illustrates an example of a user interface 400 that may be used to receive information about a charity badge, in accordance with some example embodiments. The interface 400 may be associated with the publisher's administration module 325. The interface 400 may include event type input area 405 and charity organization input area 410. Although the interface 400 illustrates selection by check boxes, other techniques of displaying and enabling the selections (e.g., pull down list, radio buttons, free-form textual input) may also be used. For some example embodiments, the payment module(s) 312 (illustrated in FIG. 2) may be configured to recognize the charity organizations listed in the charity organization input area 410 so that donations (e.g., monetary donations) may be directed to these charity organizations. It may be necessary for these charity organizations to be account holders of the payment facilitator associated with the payment module(s) 312.

Figure 4B:
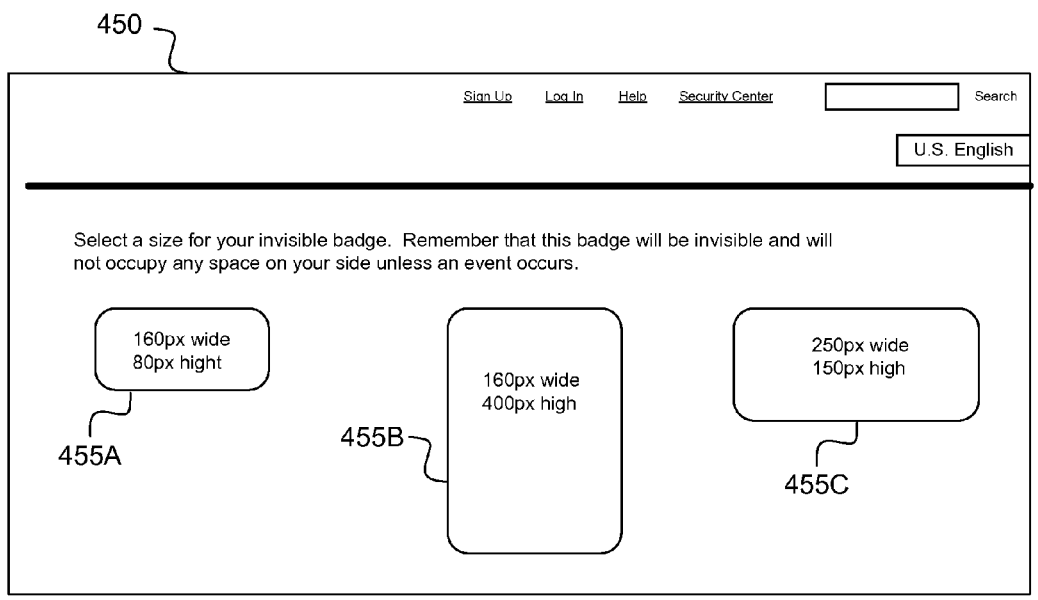
FIG. 4B is a diagram that illustrates an example of a user interface that may be used to receive information about a format of a badge to be generated, in accordance with some example embodiments.

FIG. 4B is a diagram that illustrates an example of a user interface that may be used to receive information about format of a charity badge, in accordance with some example embodiments. The format of the charity badge may include, for example, its width and height in pixels. In the current example, there may be three different formats 455A-455C that a publisher may select. The number of formats may vary depending on the implementations. As mentioned above, selecting a format for a charity badge may not necessarily cause a charity badge to be displayed. An event may need to occur to trigger the selected charity badge to be displayed. It is noted that similar interfaces may be used to establish badges for other events such as concerts and show.

Example Web Page

Figure 5A:
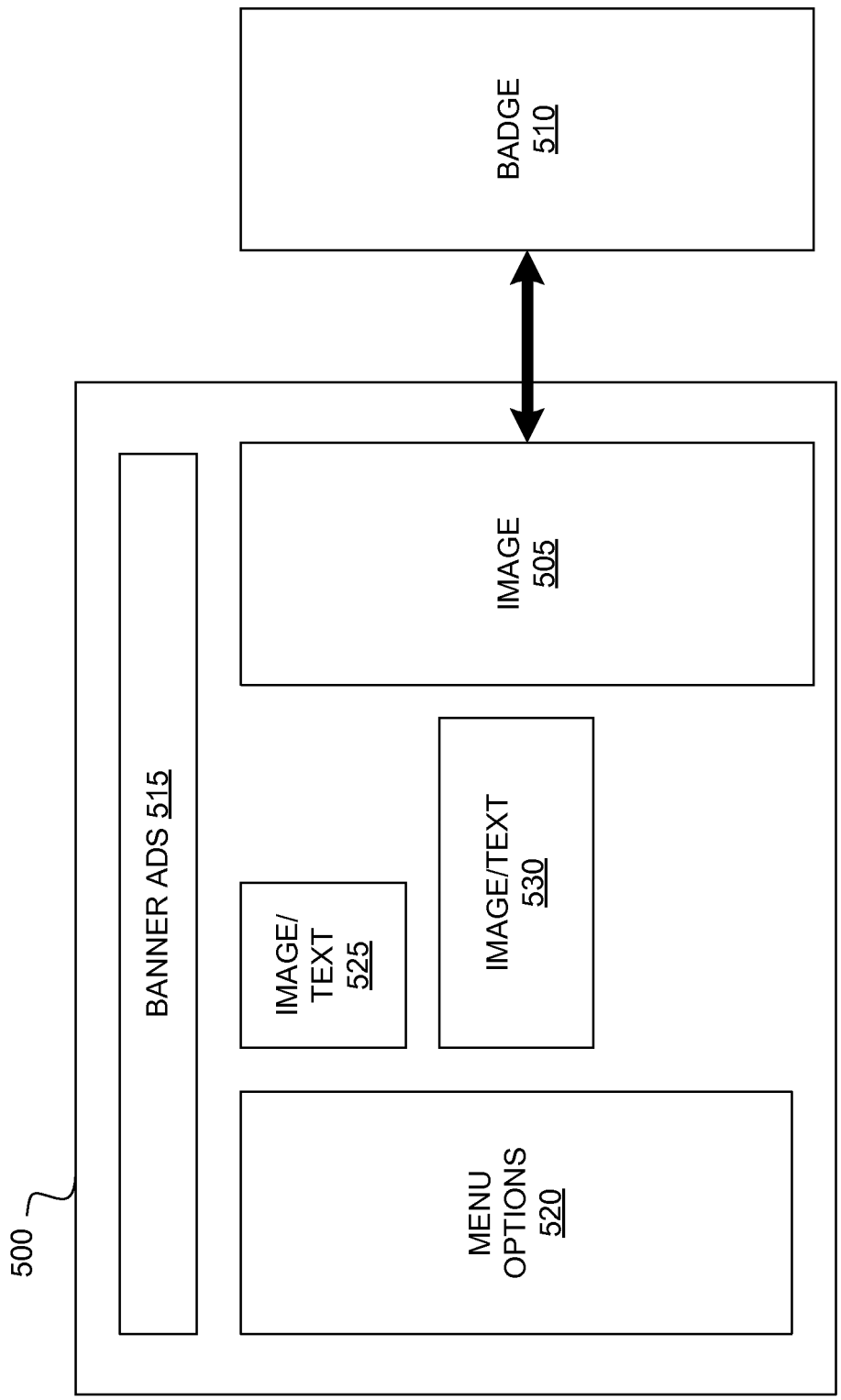
FIG. 5A illustrates an example web page where a badge may be displayed, in accordance with some example embodiments.

FIG. 5A illustrates an example web page 500 where a badge may be displayed, in accordance with some example embodiments. The web page 500 may be associated with a web site of a publisher in example embodiments. In the current example, the publisher may be associated with an online store, marketplace, or social networking site. The web page 500 may include graphics and text information. For example, there may be a banner advertisement 515, a left column 520 to display menu options, and image and/or text frames 525, 530.

Also illustrated in FIG. 5A is a badge 510 which may be placed in the right column of the web page 500 where image 505 is currently occupying. For some example embodiments, when the badge 510 is not triggered or activated (and thus not visible), the image 505 may be visible. The image 505 may be associated with a product, information, or an advertisement. When an event occurs, the badge 510 is activated, and the image 505 is replaced by the badge 510. Different techniques may be used to activate the badge 510.

Figure 5B:
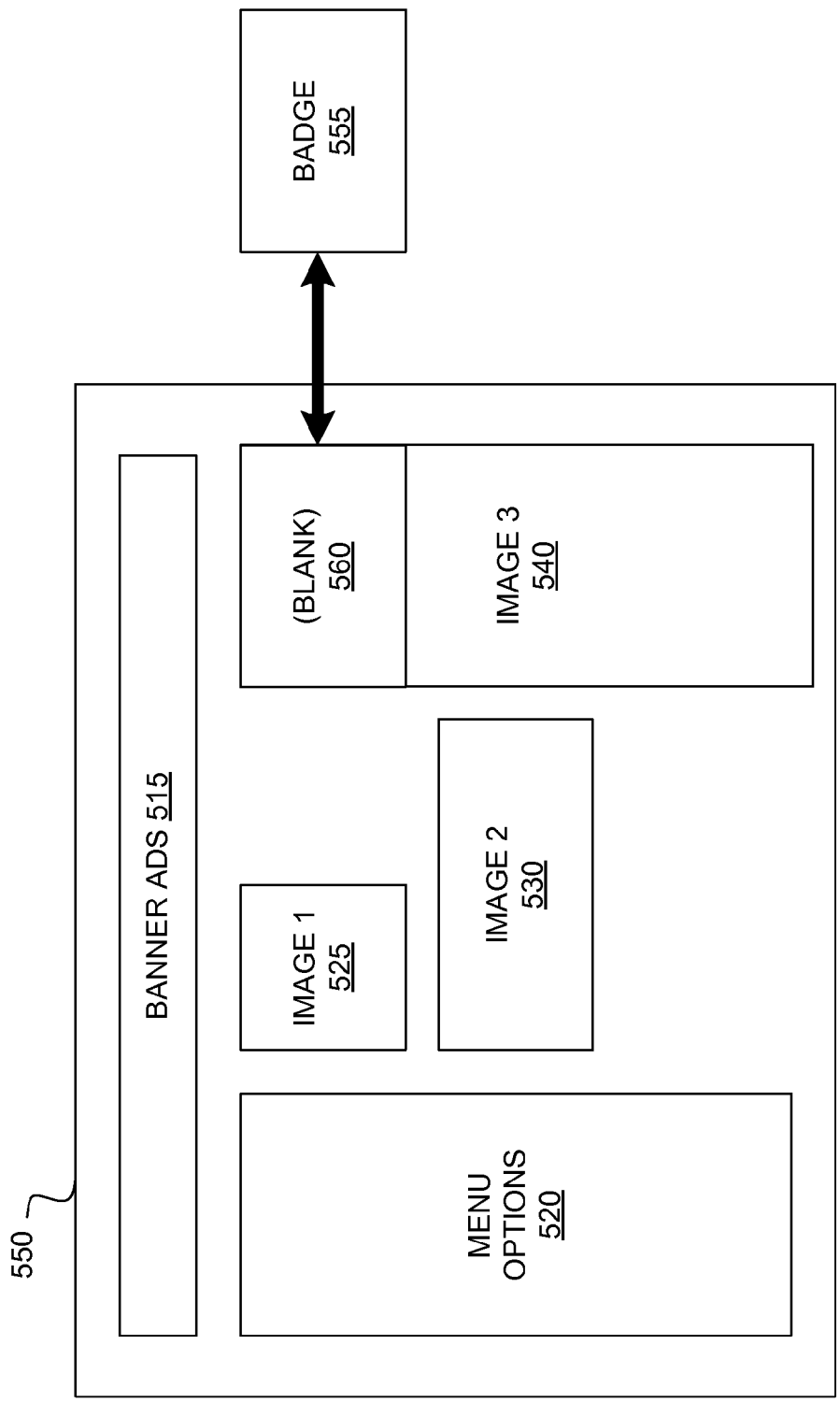
FIG. 5B illustrates another example web page where a badge may be displayed, in accordance with some example embodiments.

FIG. 5B illustrates another example web page 550 where a badge may be displayed, in accordance with some example embodiments. The web page 550 may be mostly similar to the web page 500 except for the area where a badge 555 is displayed. In this example, the web page 550 may leave the area 560 blank when the badge 555 is not activated. For some example embodiments, the badge 555 may be displayed and expanded into the web page 550. In this scenario, it may not be necessary to have the area 560 blank. For example, when the badge 555 is displayed in a column on the right side of the web page 550, all other information currently in the column may be shifted (e.g., downward).

For some example embodiments, the badge 510 of FIG. 5A and the badge 555 of FIG. 5B may become inactivated and invisible sometime after the associated event occurs (e.g., after a concert is over). In some cases, this may be based on a predetermined period of time (e.g., two weeks after the concert is over) and/or this may be based on request of the publisher.

Flowcharts

Figure 6:
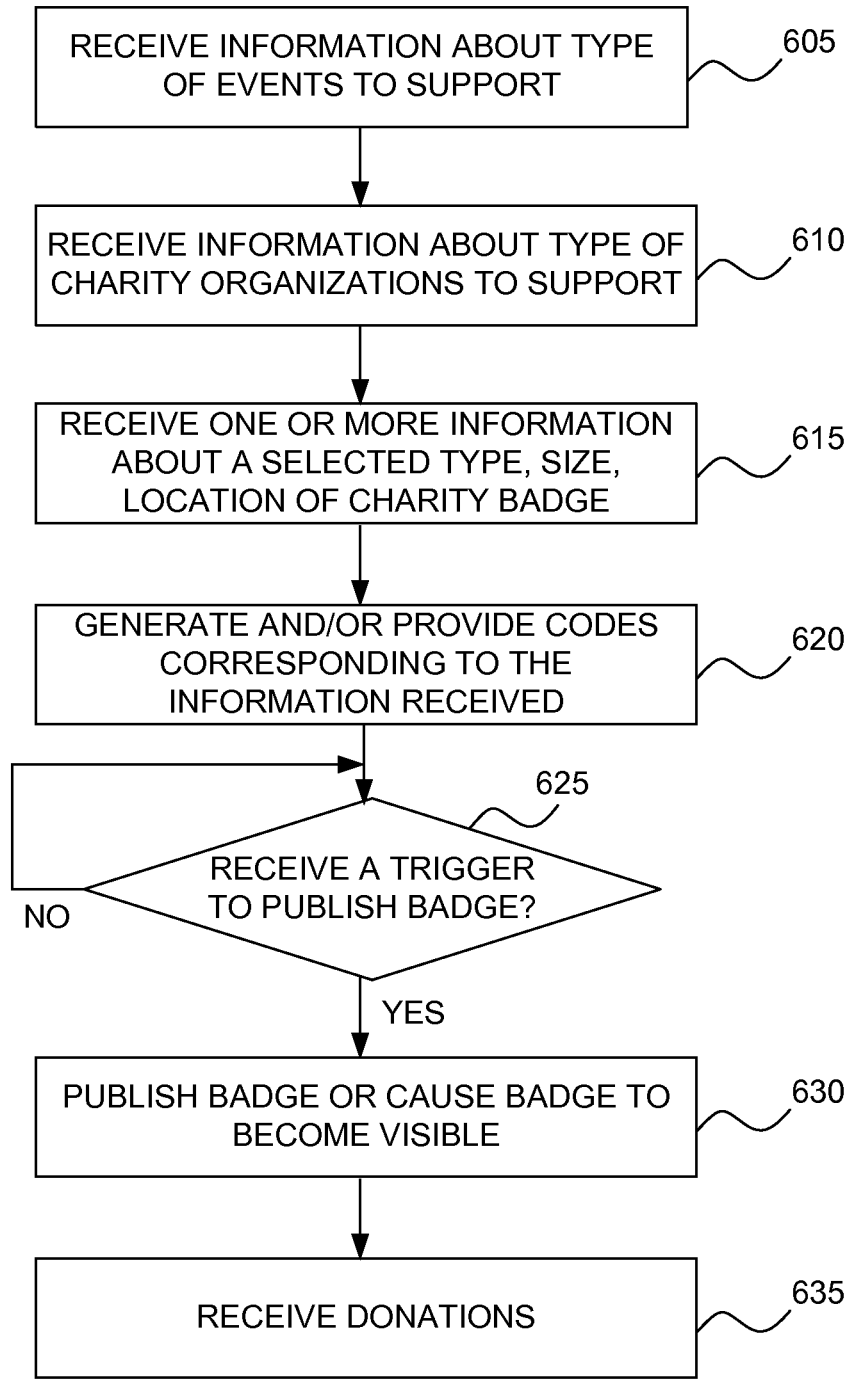
FIG. 6 illustrates a flow chart of an example method that may be used to receive information to generate a charity badge, in accordance with some example embodiments.

FIG. 6 illustrates a flow chart of an example method that may be used to receive information to generate a charity badge, in accordance with some example embodiments. The process may start in operation 605 where the information about type of events to support may be received. In operation 610, information about the types of charities to support may be received. For example, the type of events and the type of charity information may be received via the publisher's administration module(s) 325. The type of events and the type of charity information may be stored in the preference and events database 335. The publisher may also specify information about the publisher's web site. This information may be stored in the publisher web site database 340.

In operation 615, information about the format of a charity badge may be received. This may include location information, size information, and type of events supported. The information may be received via the publisher's administration module 325. In operation 620, the codes or scripts for a charity badge are generated. The codes may be generated by the badge generator module(s) 310.

In operation 625, a determination is made whether a trigger is received. The trigger may be associated with an occurrence of an event. For example, the event may be a disaster event. Information about the disaster event may be entered via the event administration module(s) 330.

When there is no trigger, the charity badge may not be published. When there is a trigger, the charity badge may be published or caused to become visible in operation 630. For example, the charity badge may be published by the badge publishing module(s) 315. In operation 635, donations may be received. For example, the donations may be received via the payment module(s) 132.

Figure 7:
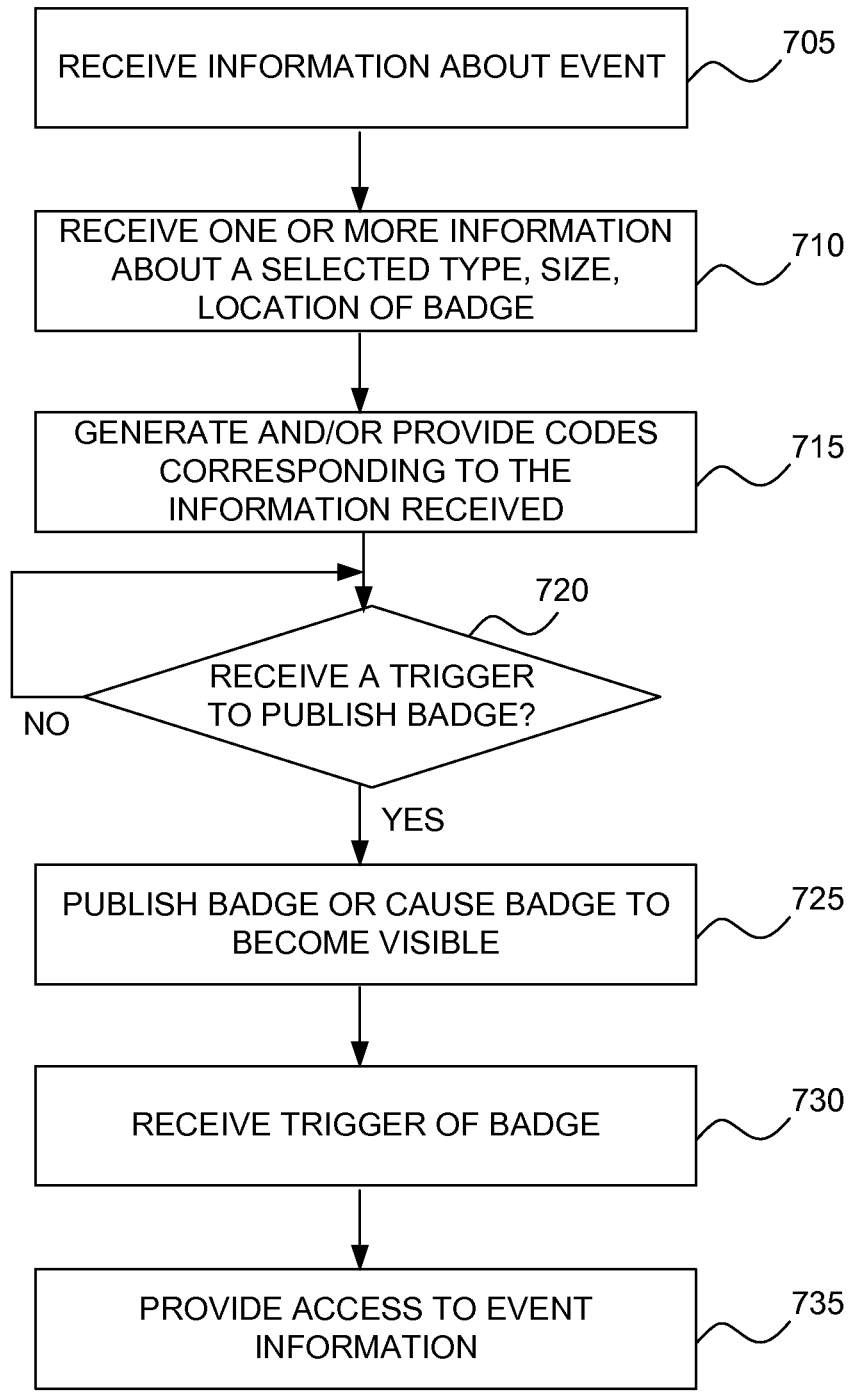
FIG. 7 illustrates a flow chart of an example method to generate and use badges for accessing event information, in accordance with some example embodiments.

FIG. 7 illustrates a flow chart of an example method to generate and use badges for accessing event information, in accordance with some example embodiments. In operation 705, information about an event is received. For example, the event may be an entertainment event (e.g., concert, show, album release) or a user event (e.g., user downloads a song from an album or purchases a ticket to a concert).

In operation 710, information about a format of a badge may be received. This may include location information and size information. The information may be received via the publisher's administration module 325 in accordance with one embodiment.

In operation 715, the codes or scripts for the badge are generated. In example embodiments, the codes may be generated by the badge generator module(s) 310. In some embodiments, the codes may be provided to a publisher to be embedded onto a web page.

In operation 720, a determination is made as to whether a trigger to publish the badge is received. The trigger may be associated with an occurrence of an event (e.g., purchase of a ticket or song by a user, indication of interest in a song by a user, an announcement of the event such as a concert date and location for a particular artist).

When there is no trigger, the badge may not be published. However, when there is a trigger, then in operation 725, the badge may be published or caused to become visible on a web page. In example embodiments, the badge may be published by the badge publishing module(s) 315. For example, if a user purchases/downloads (or indicates an interest in purchasing) a song for a particular artist (e.g., the occurrence of the event), the badge assigned to the song may be published in association with the song on a web page associated with the user. The badge may link the user to further information with respect to the song (e.g., corresponding merchandise, tickets for a show by the same artist). In another example, an announcement of concert dates and location for a particular artist (e.g., whereby the announcement is the occurrence of the event), may trigger publication of a badge that links a user that selects the badge to an opportunity to purchase tickets for the concert, purchase merchandise corresponding to the particular artist (e.g., album, t-shirts, posters), or obtain further information regarding the concert or artist.

In operation 730, a trigger of the badge is received (e.g., user clicking on or selecting the badge). In response to receiving the trigger, access to event information is provided in operation 735. For example, the badge may link the user to a website that sells tickets or related merchandise for the event. In another example, the badge may be published on a web page of a first user on a social networking site and indicate that the first user has tickets for an event. A second user may trigger the badge ("make me stay home" button) which directs the second user to a web page where the second user may make an offer to purchase the tickets from the first user.

Figure 8:
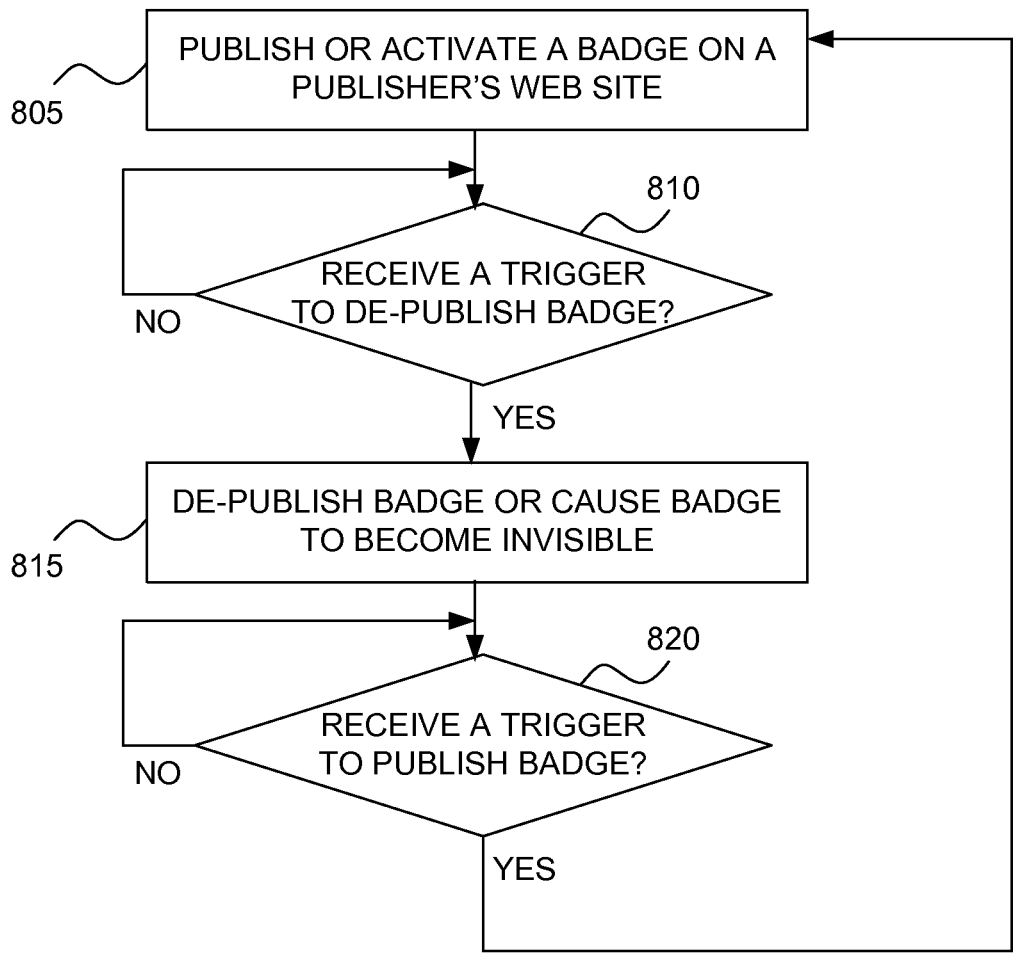
FIG. 8 illustrates a flow chart of an example method that may be used to manage a published badge, in accordance with some example embodiments.

FIG. 8 illustrates a flow chart that may be used to manage a visible badge, in accordance with some example embodiments. In operation 805, when an event occurs or is announced, a badge may be activated and displayed in a publisher's web page. In operation 810, a determination is made whether a trigger is received to de-activate the badge or to make the badge invisible. For example, when the badge is associated with a single occasion event (e.g., a disaster event or a concert on a certain date), it may be appropriate to remove the badge sometime after the event occurs (e.g., to remove access to ticket purchase for the event). Removing the badge may include causing the badge to become invisible or not visible. For some example embodiments, the trigger may be associated with a predetermined time period after an event occurs. For some example embodiments, the trigger may be determined by the publisher or an event administrator. When the trigger is received, the badge may be de-activated in operation 815.

In operation 820, a determination is made whether a trigger signal to activate the badge is received. For example, another similar event may occur or will occur (e.g., announcement of an additional concert on another date or location). If the trigger signal is received, the charity badge is activated in operation 805. If the trigger signal is not received, the process may end. In the current example, the process is illustrated as remaining in operation 820 to continue to wait for the trigger signal to activate the charity badge.

Platform Architecture

Figure 9:
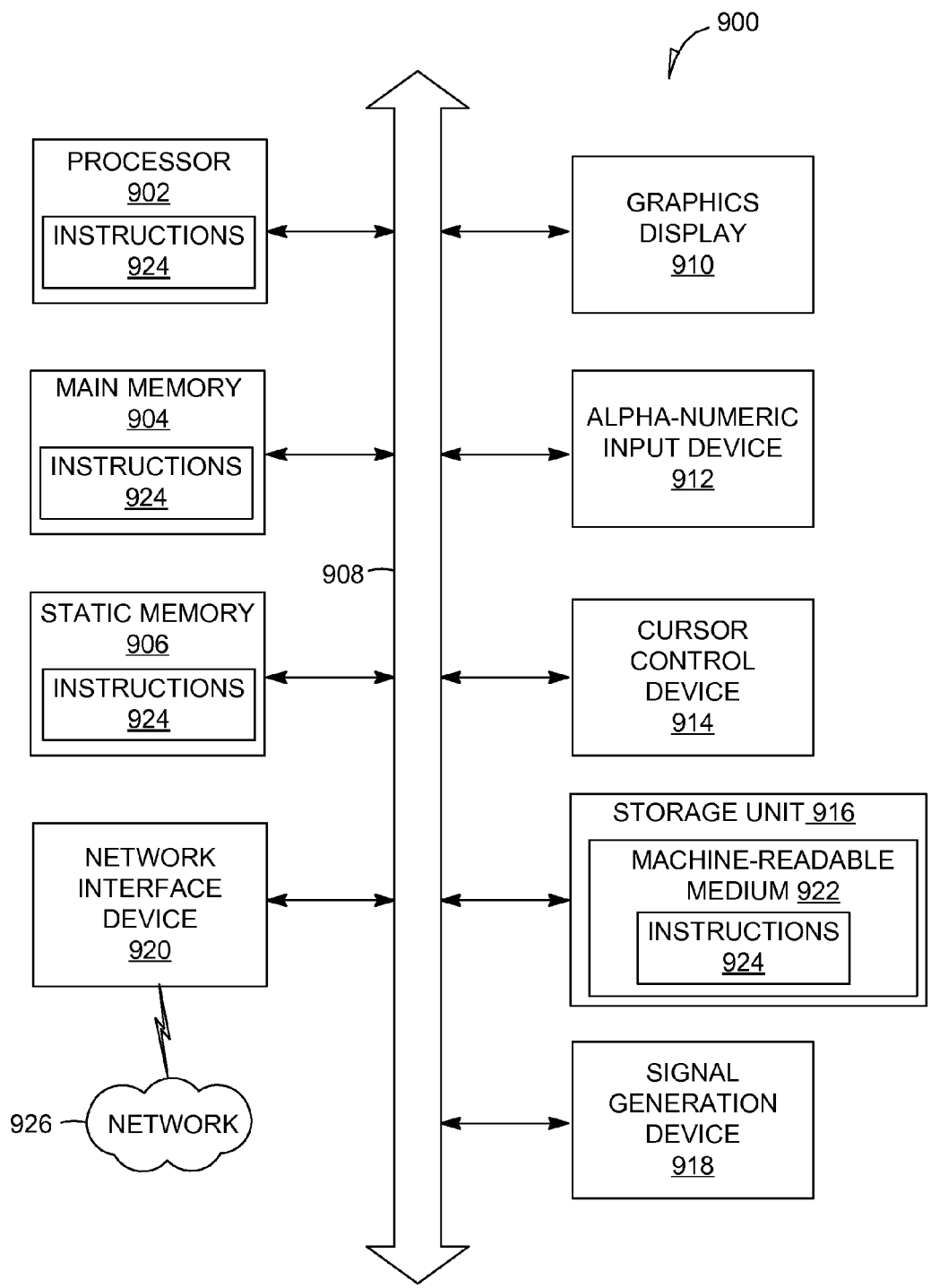
FIG. 9 illustrates a diagrammatic representation of a machine in the form of a computer system within which a set of instructions, for causing the machine to perform any one or more of the methodologies discussed herein, may be executed, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   generating codes for a badge to be displayed on a web page of a web site, the generating performed by a hardware processor;
   causing the codes for the badge to be embedded in a location on the web page prior to an occurrence of an event external to the web site, the embedded codes causing the badge to be invisible in the location on the web page prior to the occurrence of the event external to the web site, the event external to the web site comprising an event not initiated by a user interacting with the web page on a device of the user;
   receiving an indication of an occurrence of the event, the indication including attributes of the event that has occurred; and
   based on the attributes of the event that has occurred matching attributes for a future event stored in a database, transmitting an activation signal to cause activation of the embedded codes to make the badge visible in the location on the web page, the attributes for the future event having been previously received from a publisher of the web site and being used to trigger display of the badge based on the attributes of the event that has occurred matching the attributes for the future event stored in the database.

2. The method of claim 1, further comprising:
   receiving an indication of a selection of the badge from a user; and
   linking the user to further information corresponding to the event in response to receiving the indication.

3. The method of claim 1, further comprising:
   receiving an indication of a selection of the badge from the device of the user; and
   responsive to the indication of the selection of the badge, directing the device of the user to a website that sells merchandise corresponding to the event.

4. The method of claim 1, wherein the occurrence of the event comprises an announcement for a related second event, the method comprising:
   receiving an indication of a selection of the badge from the device of the user; and
   responsive to the indication of the selection of the badge, directing the device of the user to a website that sells tickets to the second event.

5. The method of claim 1, further comprising:
   receiving an indication of a selection of the badge from the device of the user; and
   responsive to the indication of the selection of the badge, directing the device of the user to a web page that displays an option for the user to make an offer to purchase a ticket.

6. The method of claim 1, wherein the badge comprises an indicator that an individual has a ticket to a related second event, the method further comprising:
   receiving an indication of a selection of the badge from the device of the user; and
   responsive to the indication of the selection of the badge directing the device of the user to a web page that displays an option for the user to make an offer to purchase the ticket from the individual.

7. The method of claim 2, wherein the badge is provided in conjunction with an item that was purchased and wherein the further information comprises information about the purchased item.

8. The method of claim 2, wherein the badge is provided in conjunction with an item that an individual indicates interest in and wherein the further information comprises an option to purchase the item.

9. The method of claim 1, wherein the badge is a Quick Response (QR) code.

10. The method of claim 1, wherein the attributes of the event comprise one or more of a type of event, a geography of the event, or an organization that supports the event.

11. A non-transitory machine-readable medium storing instructions which, when executed by the at least one processor of a machine, cause the machine to perform operations comprising:
    generating codes for a badge to be displayed on a web page of a web site;
    causing the codes for the badge to be embedded in a location on the web page prior to an occurrence of an event external to the web site, the embedded codes causing the badge to be invisible in the location on the web page prior to the occurrence of the event external to the web site, the event external to the web site comprising an event not initiated by a user interacting with the web page on a device of the user;
    receiving an indication of an occurrence of the event, the indication including attributes of the event that has occurred; and
    based on the attributes of the event that has occurred matching attributes for a future event stored in a database, transmitting an activation signal to cause activation of the embedded codes to make the badge visible in the location on the web page, the attributes for the future event having been previously received from a publisher of the web site and being used to trigger display of the badge based on the attributes of the event that has occurred matching the attributes for the future event stored in the database.

12. The non-transitory machine-readable medium of claim 11, wherein the operations further comprise:
  receiving an indication of a selection of the badge from a user; and
  linking the user to further information corresponding to the event in response to receiving the indication.

13. The non-transitory machine-readable medium of claim 12, wherein the information provided in response to receiving the indication of the selection comprises a selection of an option from the group of options consisting of:
  an option to purchase merchandise associated with the event,
  an option to purchase a ticket, and
  an option for a user selecting the badge to make an offer to purchase a ticket.

14. The non-transitory machine-readable medium of claim 11, wherein the badge comprises an indicator that an individual has a ticket to a related second event, the operations further comprising:
  receiving an indication of a selection of the badge from the device of the user; and
  responsive to the indication of the selection of the badge, directing the device of the user to a web page that displays an option to make an offer to purchase the ticket from the individual.

15. The non-transitory machine-readable medium of claim 12, wherein the badge is provided in conjunction with an item that was purchased and wherein the further information comprises information about the purchased item.

16. The non-transitory machine-readable medium of claim 12, wherein the badge is provided in conjunction with an item that an individual indicates interest in and wherein the further information comprises an option to purchase the item.

17. A system comprising:
  a badge generator module, comprising a processor, configured to generate codes for a badge to be displayed on a web page of a web site, the codes for the badge to be embedded in a location on the web page prior to an occurrence of an event external to the web site, the embedded codes causing the badge to be invisible in the location on the web page prior to the occurrence of the event external to the web site, the event external to the web site comprising an event not initiated by a user interacting with the web page on a device of the user;
  an event administration module configured to receive an indication of an occurrence of the event, the indication including attributes of the event that has occurred; and
  a badge publishing module configured to, based on the attributes of the event that has occurred matching attributes for a future event stored in the database, transmit an activation signal to cause activation of the embedded codes to make the badge visible in the location on the web page, the attributes for the future event having been previously received from a publisher of the web site and being used to trigger display of the badge based on the attributes of the event that has occurred matching the attributes for the future event stored in the database.

18. The system of claim 17, wherein the badge publishing module is further configured to cause the codes to enable the badge to become not visible after a predetermined period of time following the occurrence of the event.

19. The non-transitory machine-readable medium of claim 13, wherein the linking the user to further information comprises directing the user to a webpage that displays the selection of the option from the group of options.

20. The method of claim 1, wherein the transmitting the activation signal comprises transmitting script that causes the activation of the embedded code to make the badge visible.

* * * * *